(12) United States Patent
Chang (10) Patent No.: US 10,022,808 B2
(45) Date of Patent: Jul. 17, 2018

(54) POCKET HOLE JIG

(71) Applicant: Chao-Chuan Chang, Taichung (TW)

(72) Inventor: Chao-Chuan Chang, Taichung (TW)

( * ) Notice: Subject to any disclaimer, the term of this patent is extended or adjusted under 35 U.S.C. 154(b) by 230 days.

(21) Appl. No.: 15/097,297

(22) Filed: Apr. 13, 2016

(65) Prior Publication Data

US 2017/0297119 A1    Oct. 19, 2017

(51) Int. Cl.
*B23B 49/02*    (2006.01)

(52) U.S. Cl.
CPC .......... *B23B 49/02* (2013.01); *B23B 2247/10* (2013.01); *B23B 2260/104* (2013.01)

(58) Field of Classification Search
CPC .......... B23B 2247/10; B23B 2260/104; B23B 49/02
See application file for complete search history.

(56) References Cited

U.S. PATENT DOCUMENTS

| | | | | |
|---|---|---|---|---|
| 5,322,396 A * | 6/1994 | Blacker | ................ | B23B 47/287 408/72 R |
| 7,641,425 B2 * | 1/2010 | Sommerfeld | ......... | B23B 47/287 269/224 |
| 8,375,541 B1 * | 2/2013 | Beachy | ................ | B23B 47/281 29/26 A |
| 2003/0123941 A1 * | 7/2003 | Emerson | ................ | B23B 47/28 408/103 |
| 2006/0228180 A1 * | 10/2006 | Sommerfeld | ......... | B23B 47/287 408/115 R |
| 2008/0187404 A1 * | 8/2008 | Chiang | ................ | B23B 47/287 408/115 R |
| 2009/0053003 A1 * | 2/2009 | Clark | .................... | B23B 47/287 408/103 |
| 2012/0051865 A1 * | 3/2012 | Liu | ........................ | B23B 47/28 408/108 |
| 2014/0341665 A1 * | 11/2014 | Clark | ................. | B23Q 11/0042 408/67 |

* cited by examiner

*Primary Examiner* — Christopher R Harmon (57) ABSTRACT

A pocket hole jig contains: a body, a holder, and a fitting sleeve. The body includes at least one accommodation orifice configured to house a driller, each accommodation orifice tilts downwardly and extends toward a bottom of the body, wherein the body also includes a first marking portion arranged on a first side surface thereof. The holder includes an operation room in which the body is fitted and moves relative to the holder, at least one through groove formed on a bottom of the holder so as to correspond to the at least one accommodation orifice, and a first scale section arranged on a first side surface thereof and aligning with the first marking portion. The fitting sleeve is fitted with the driller, and the holder further includes a depth scale section for measuring depths of holes drilled on wooden workpieces by the driller.

8 Claims, 10 Drawing Sheets

POCKET HOLE JIG

FIELD OF THE INVENTION

The present invention relates to a pocket hole jig which is capable of drilling holes of wooden workpiece at desired angles and adjusting drilling positions of the wooden workpieces accurately.

BACKGROUND OF THE INVENTION

A conventional pocket hole jig for drilling wooden workpieces is disclosed in Taiwan Patent No. M297278 and contains a guiding column with a body, and the body includes a aligning face defined on a bottom thereof so as to contact with the wooden workpieces in drilling process, and the body also includes a tilted face defined on a front end thereof and a recess, wherein the recess tilts toward the aligning face from the tilted face, and the tilted face has a guide sleeve configured to guide a driller toward the wooden workpieces via the recess, and the body further includes an abutting face formed on a rear end thereof and perpendicular to the aligning face, such that when the abutting face is in alignment with an edge of a wooden workpiece, a central line of the driller aligns with a center of a thickness of the wooden workpiece by means of the tilted face. The abutting face has an orifice extending toward the body so as to house an extension block, thus changing a horizontal distance between the guiding column and the edge of the wooden workpiece. The extension block has a coupling post adjacent to the abutting face, when the extension block is in connection with the body, the coupling post is accommodated in the orifice of the body.

However, the conventional pocket hole jig is applicable for screws of various sizes by using a plurality of extension blocks, thus causing using inconvenience.

The present invention has arisen to mitigate and/or obviate the afore-described disadvantages.

SUMMARY OF THE INVENTION

The primary objective of the present invention is to provide a pocket hole jig which is capable of drilling holes of wooden workpieces at desired angles and adjusting drilling positions of the wooden workpieces accurately.

Another objective of the present invention is to provide a pocket hole jig which measures thickness of the wooden workpieces easily and determines a size of a screw exactly. To obtain the above objectives, a pocket hole jig provided by the present invention contains: a body, a holder, and a fitting sleeve.

The body includes at least one accommodation orifice defined on one end thereof and configured to house a driller, each accommodation orifice tilts downwardly and extends toward a bottom of the body, wherein the body also includes a first marking portion arranged on a first side surface thereof.

The holder includes an operation room in which the body is fitted and moves relative to the holder, at least one through groove formed on a bottom of the holder so as to correspond to the at least one accommodation orifice, and a first scale section arranged on a first side surface thereof and aligning with the first marking portion, such that user distinguishes a position of the body relative to the holder and to determine a size of a screw.

The fitting sleeve is fitted with the driller, and the holder further includes a depth scale section for measuring depths of holes drilled on wooden workpieces by the driller.

DETAILED DESCRIPTION OF THE PREFERRED EMBODIMENTS

With reference to FIGS. 1 to 12, a pocket hole jig according to a preferred embodiment of the present invention is capable of drilling holes of wooden workpieces at desired angles and adjusting drilling positions of the wooden workpieces accurately, the pocket hole jig comprises: a body 1, a holder 2, and a fitting sleeve 3.

Figure 1:
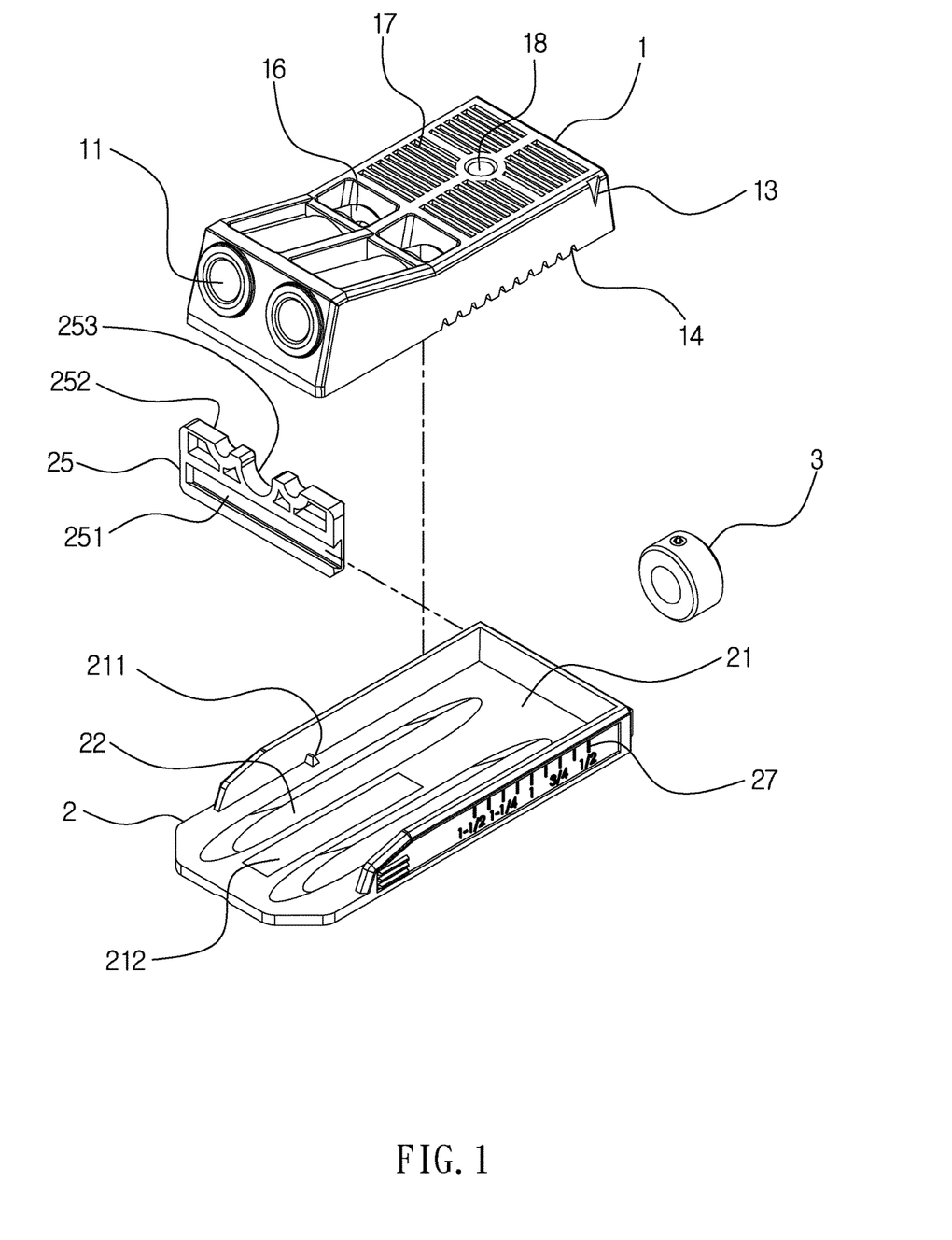
FIG. 1 is a perspective view showing the exploded components of a pocket hole jig according to a preferred embodiment of the present invention.
Figure 2:
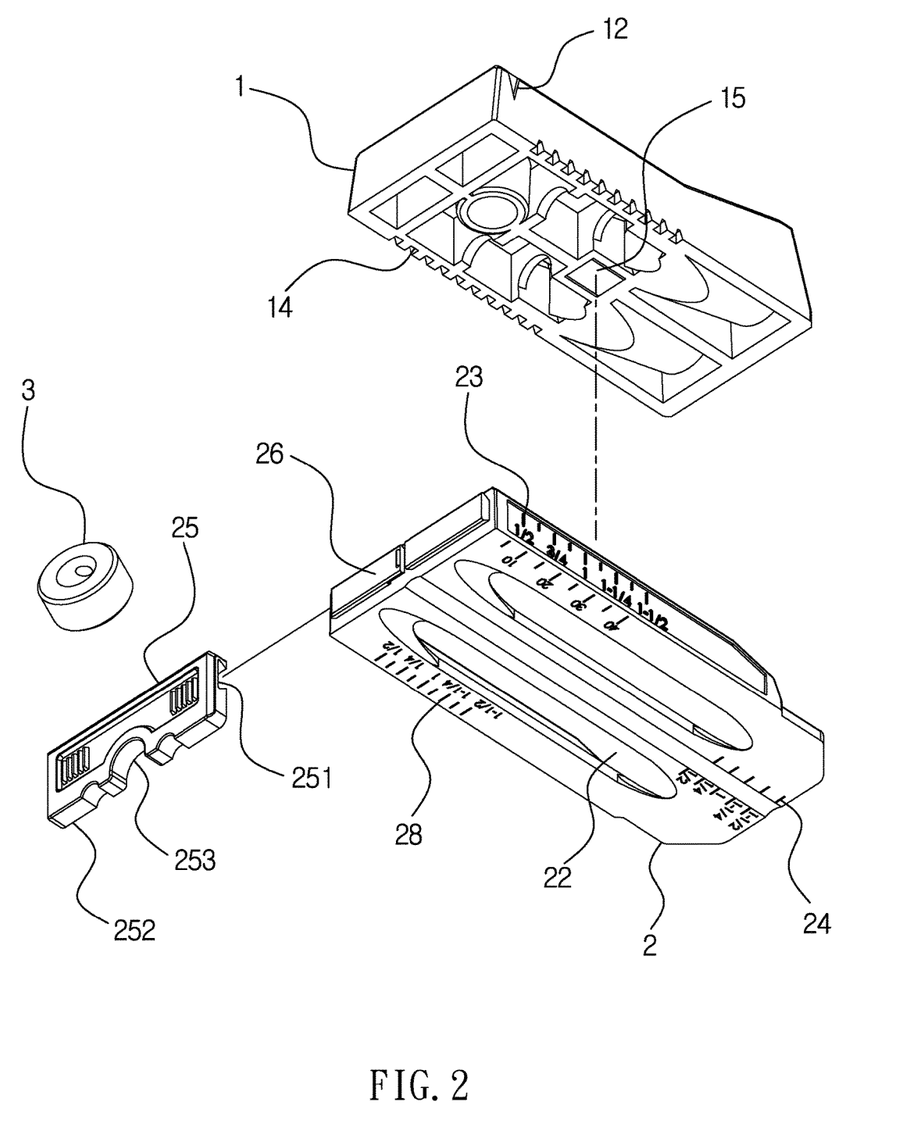
FIG. 2 is another perspective view showing the exploded components of the pocket hole jig according to the preferred embodiment of the present invention.
Figure 3:
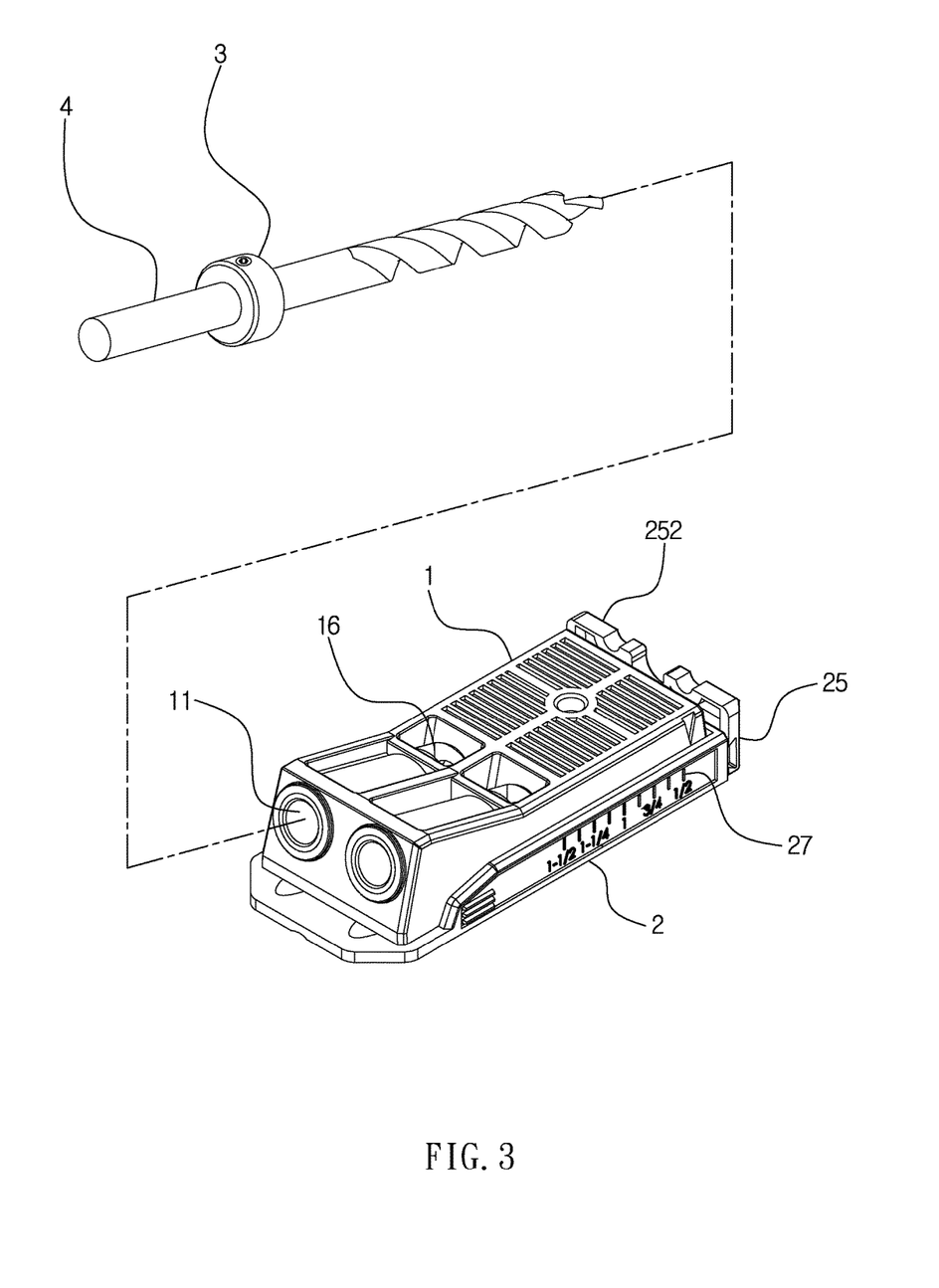
FIG. 3 is also another perspective view showing the exploded components of the pocket hole jig according to the preferred embodiment of the present invention.

The body 1 includes at least one accommodation orifice 11 defined on one end thereof, in this embodiment, two accommodation orifices 11 are defined on the one end of the body 1 and are configured to house a driller 4, wherein each accommodation orifice 11 tilts downwardly and extends toward a bottom of the body 1. The body 1 also includes a first marking portion 12 arranged on a first side surface thereof. The holder 2 includes an operation room 21 in which the body 1 is fitted and moves relative to the holder 21, at least one through groove 22 formed on a bottom of the holder 2 so as to correspond to the two accommodation orifices 11 respectively, and a first scale section 23 arranged on a first side surface thereof and aligning with the first marking portion 12, such that user distinguishes a position of the body 1 relative to the holder 2 and to determine a size of a screw. The fitting sleeve 3 is fitted with the driller 4, and the holder 2 further includes a depth scale section 24 for measuring depths of holes drilled by the driller 4.

The holder 2 further includes a stop plate 25 and a dovetail block 26 which are arranged on a first end of the holder 2, wherein the stop plate 25 has a dovetail trench 251 for engaging with the dovetail block 26 and has a contacting extension 252 fixed over a top or the bottom of the holder 2. The body 1 further includes a second marking portion 13 arranged on a second side surface thereof, and the holder 2 further includes a second scale section 27 arranged on a second side surface thereof and aligning with the second marking portion 13, such that the user distinguishes the position of the body 1 relative to the holder 2 and to determine the size of the screw. When the contacting extension 252 is fixed over the top of the holder 2, the position of the body 1 relative to the holder 2 is adjusted by way of the first marking portion 12 and the first scale section 23. When the contacting extension 252 is fixed over the bottom of the holder 2, the body 1 and the holder 2 are applied to measure the drilling positions of the wooden workpieces by way of the second marking portion 13 and the second scale section 27.

Figure 4:
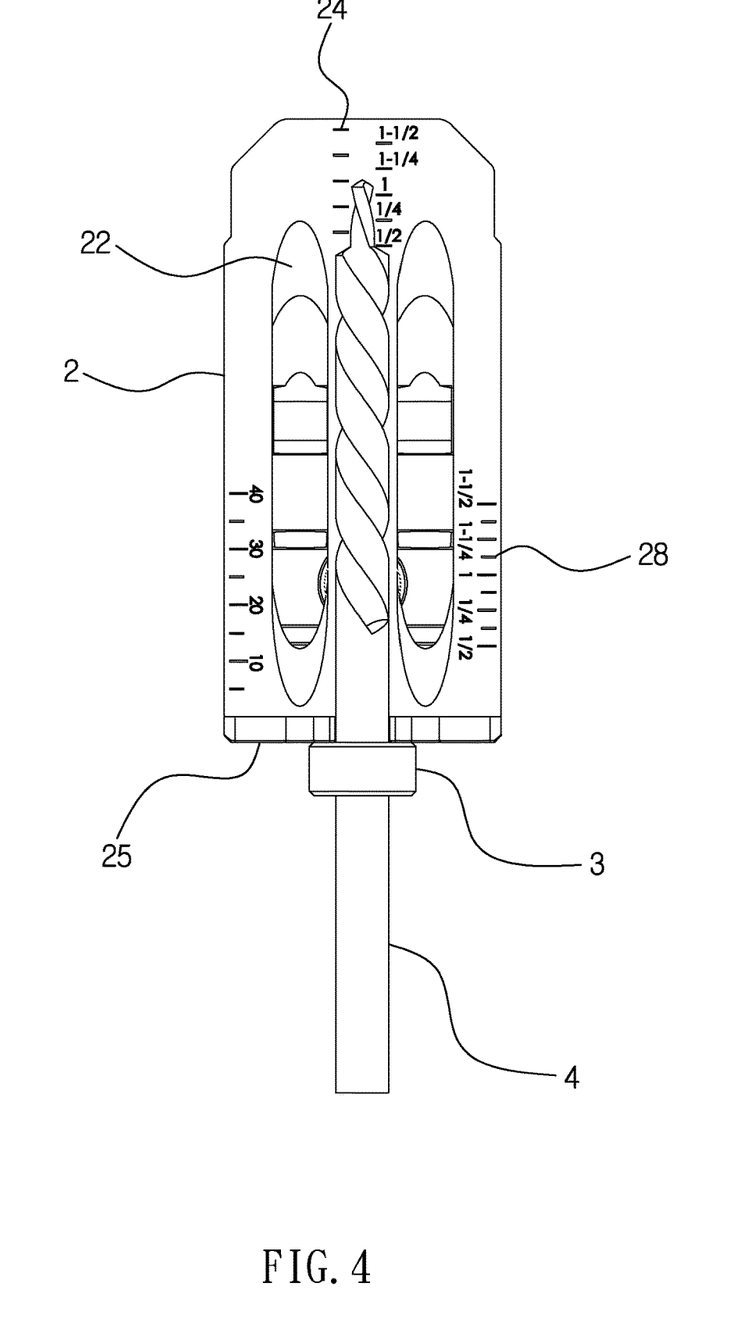
FIG. 4 is a side plan view showing the operation of a driller of the pocket hole jig according to the preferred embodiment of the present invention.
Figure 5:
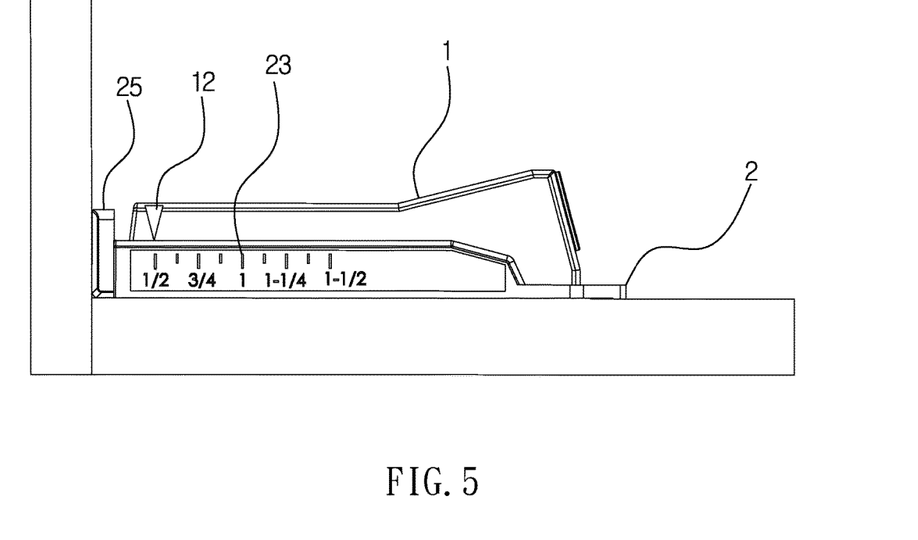
FIG. 5 is a side plan view showing the operation of a fitting sleeve of the pocket hole jig according to the preferred embodiment of the present invention.
Figure 6:
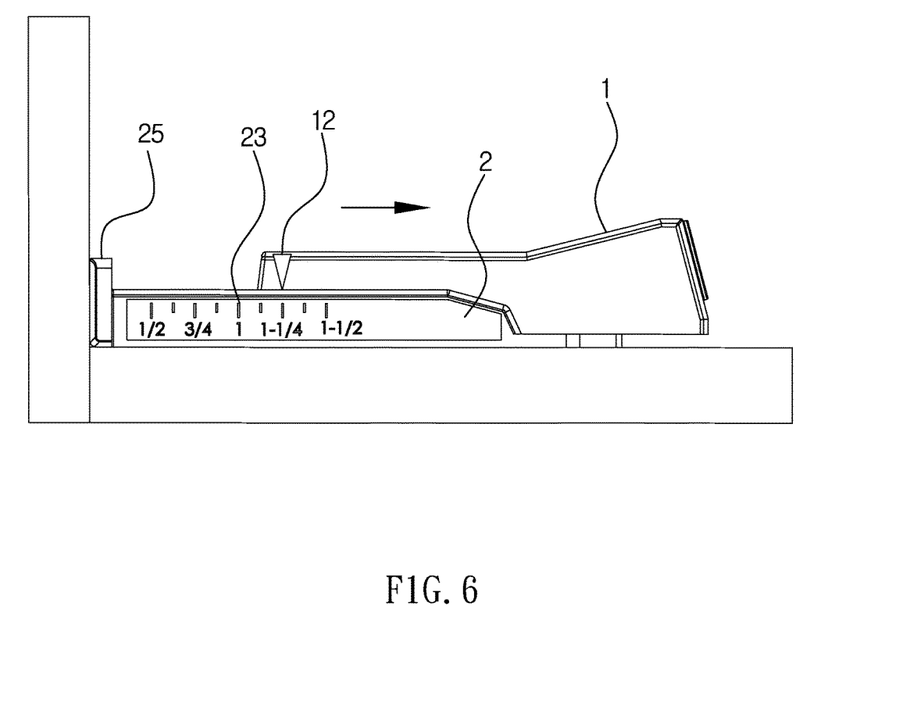
FIG. 6 is another side plan view showing the operation of a fitting sleeve of the pocket hole jig according to the preferred embodiment of the present invention.
Figure 7:
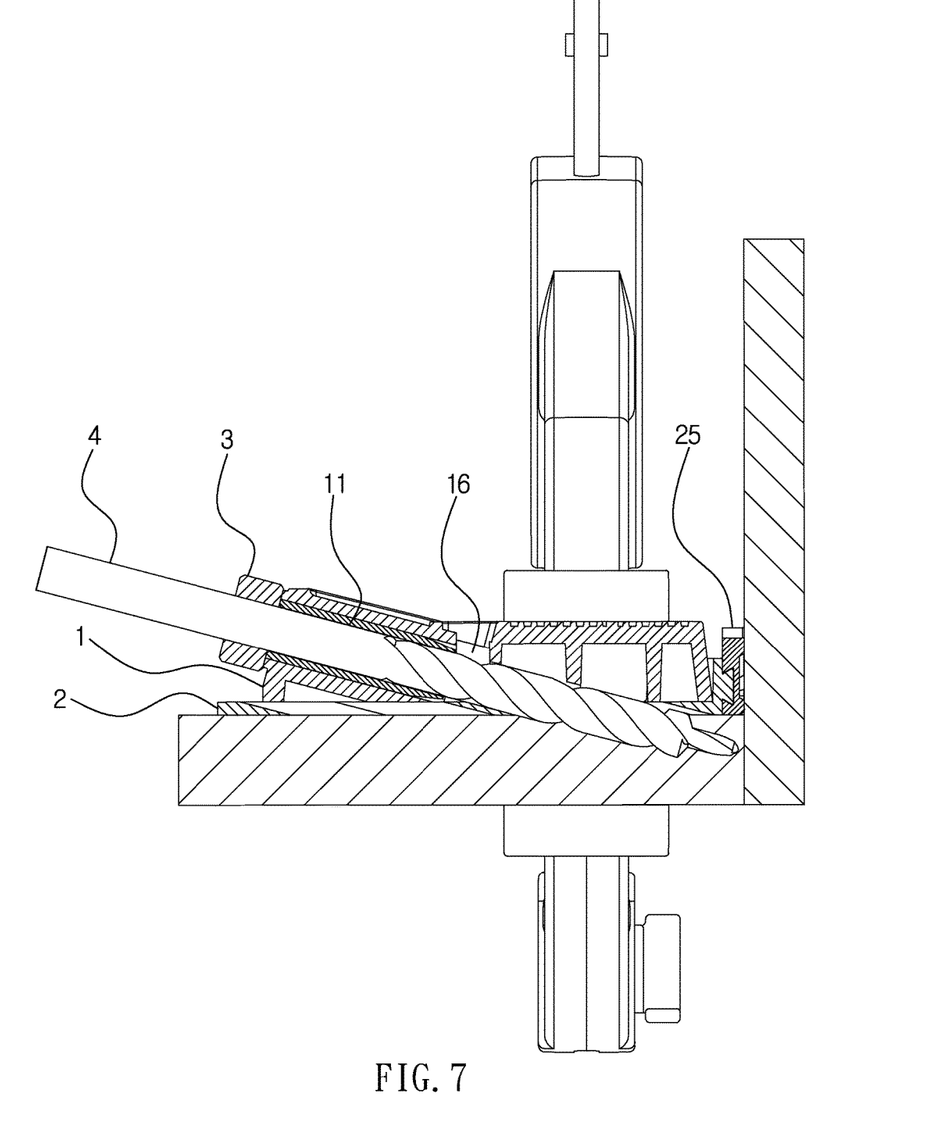
FIG. 7 is a cross sectional view showing the operation of a fitting sleeve of the pocket hole jig according to the preferred embodiment of the present invention.
Figure 8:
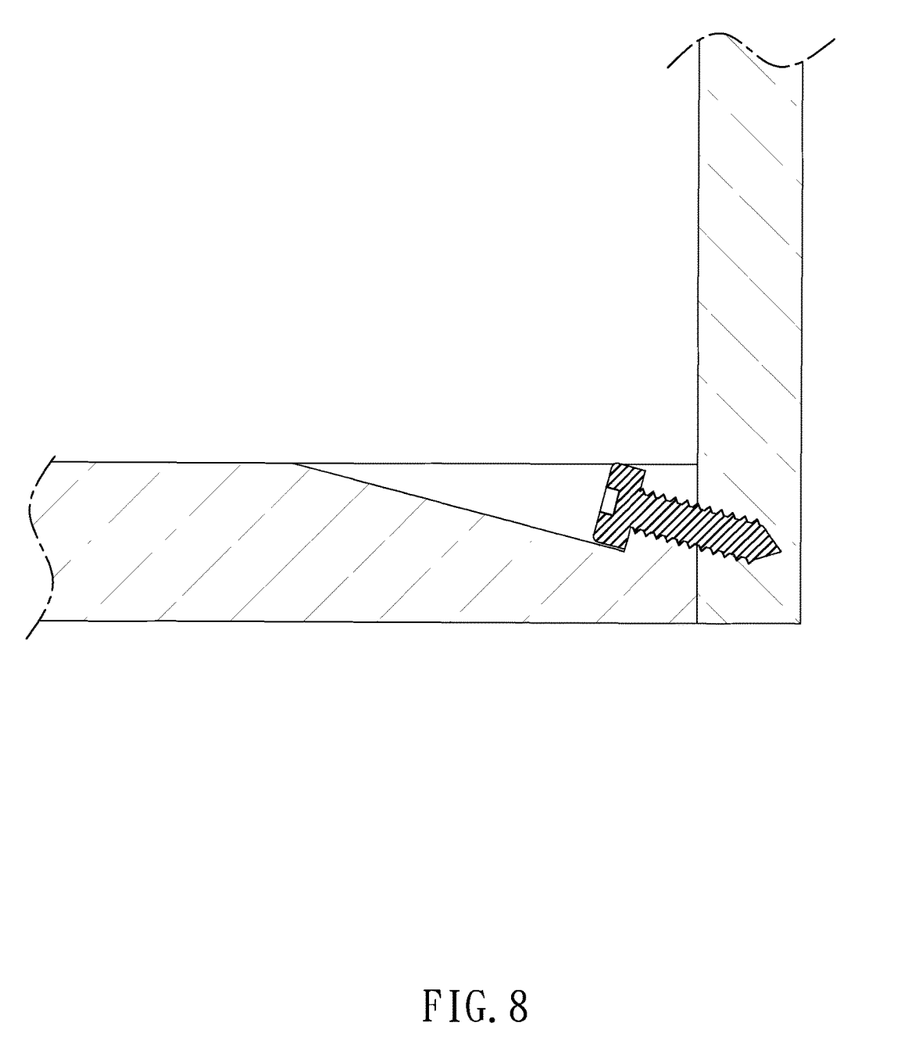
FIGS. 8 is a cross sectional view showing the operation of the pocket hole jig according to the preferred embodiment of the present invention.

Referring to FIG. 4, after the user chooses a specific screw in response to a thickness of a workpiece by using the depth scale section 24 so as to measure a drilling depth of the driller 4, wherein an adjustable range of the drilling depth of the driller 4 is within 0.5 inch to 1.5 inch. It is to be noted that the fitting sleeve 3 limits a maximum drilling depth of the driller 4. As shown in FIGS. 5 and 6, when the contacting extension 252 is fixed over the top of the holder 2, the holder 2 aligns with an edge of wooden workpiece, and the position of the body 1 relative to the holder 2 is adjusted by way of the first marking portion 12 and the first scale section 23.

Figure 9:
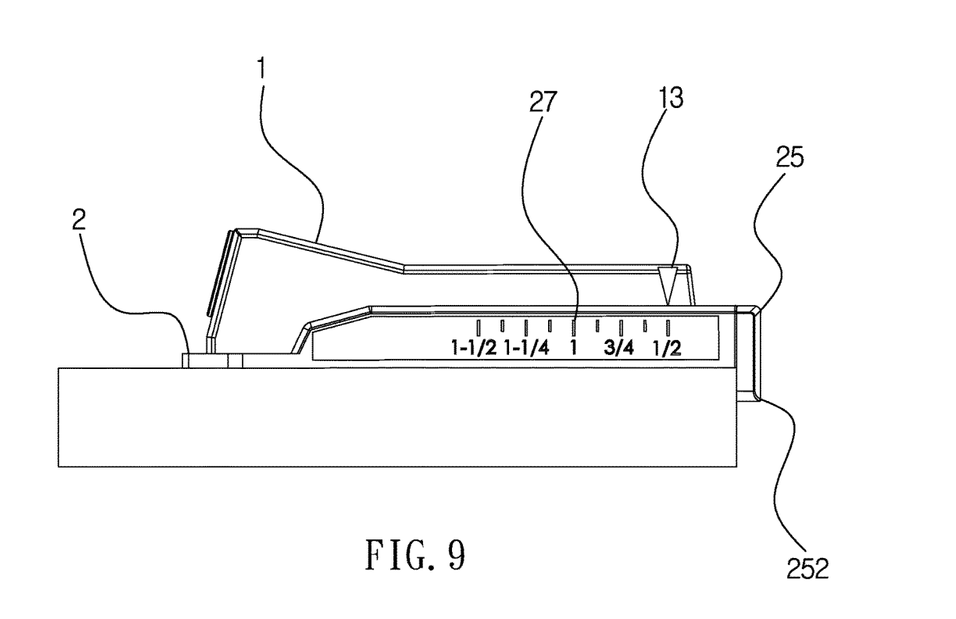
FIG. 9 is also another side plan view showing the operation of the fitting sleeve of the pocket hole jig according to the preferred embodiment of the present invention.
Figure 10:
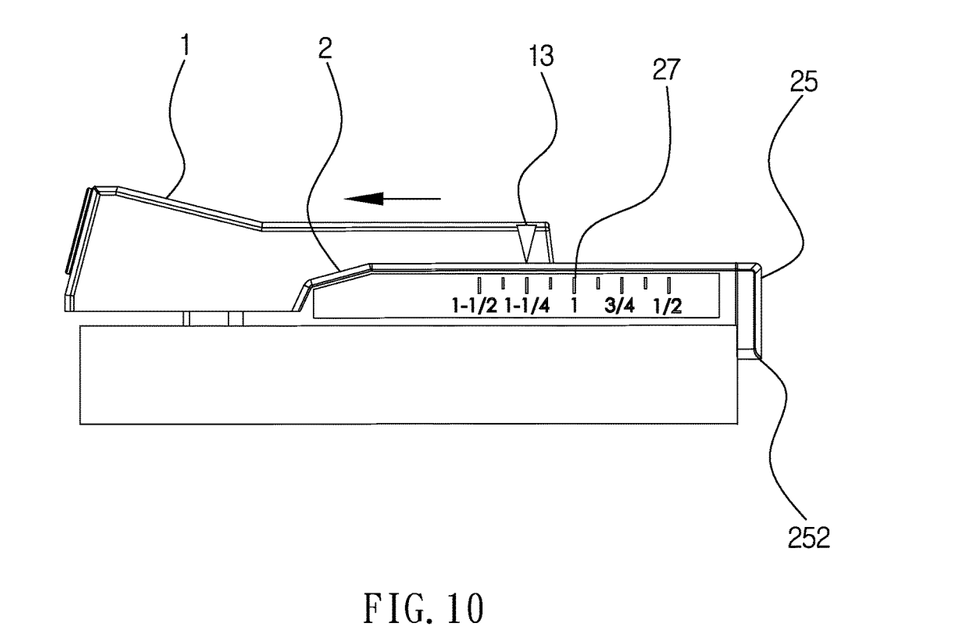
FIG. 10 is still another side plan view showing the operation of the fitting sleeve of the pocket hole jig according to the preferred embodiment of the present invention.
Figure 11:
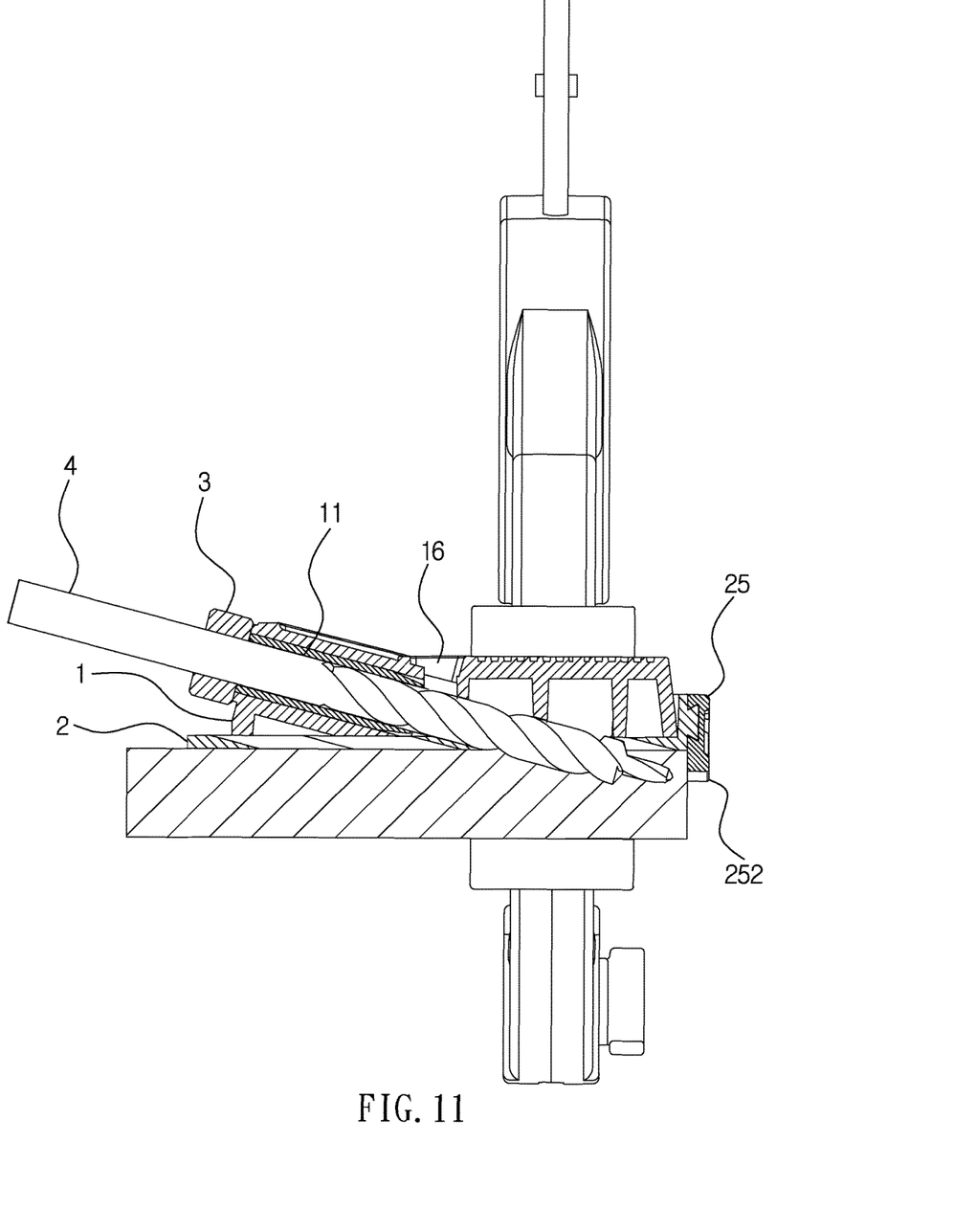
FIG. 11 is another cross sectional view showing the operation of the fitting sleeve of the pocket hole jig according to the preferred embodiment of the present invention.

Referring further to FIGS, 7 and 8, a clamper clamps the body 1, the holder 2, and the wooden workpiece, and the driller 4 drills the wooden workpiece via the fitting sleeve 3 and one of the two accommodation orifices 11. With reference to FIGS. 9 to 11, the contacting extension 252 is fixed over the bottom of the holder 2, and the holder 2 contacts with the edge of the wooden workpiece, then the position of the body 1 relative to the holder 2 is adjusted by way of the second marking portion 13 and the second scale section 27 so as to drill the wooden workpiece.

The holder 2 further includes at least one rib 211 formed in the operation room 21, and the body 1 further includes a toothed section 14 arranged on the bottom thereof so as to selectively engage with the at least one rib 211, hence the body 1 and the holder 2 are connected together accurately.

The body 1 includes a first magnetic attraction element 15 mounted on the bottom thereof, and the holder 2 includes a metal projection 212 for magnetically attracting with the first magnetic attraction element 15 so as to fix the body 1 and the holder 2 together.

The body 1 further includes at least one chip elimination opening 16 defined on the top thereof and communicating with the two accommodation orifices 11, respectively, thus eliminating chips quickly after drilling the wooden workpiece. The contacting extension 252 has a receiving trough 253 defined thereon so as to house the driller 4, such that the driller 4 is not interfered by the contacting extension 252 in drilling process.

The body 1 further includes a pressing face 17 formed on the top thereof so as to be clamped by the clamper, and the pressing face 17 has anti-slip patterns arranged thereon so as to enhance clamping capacity of the damper.

Figure 12:
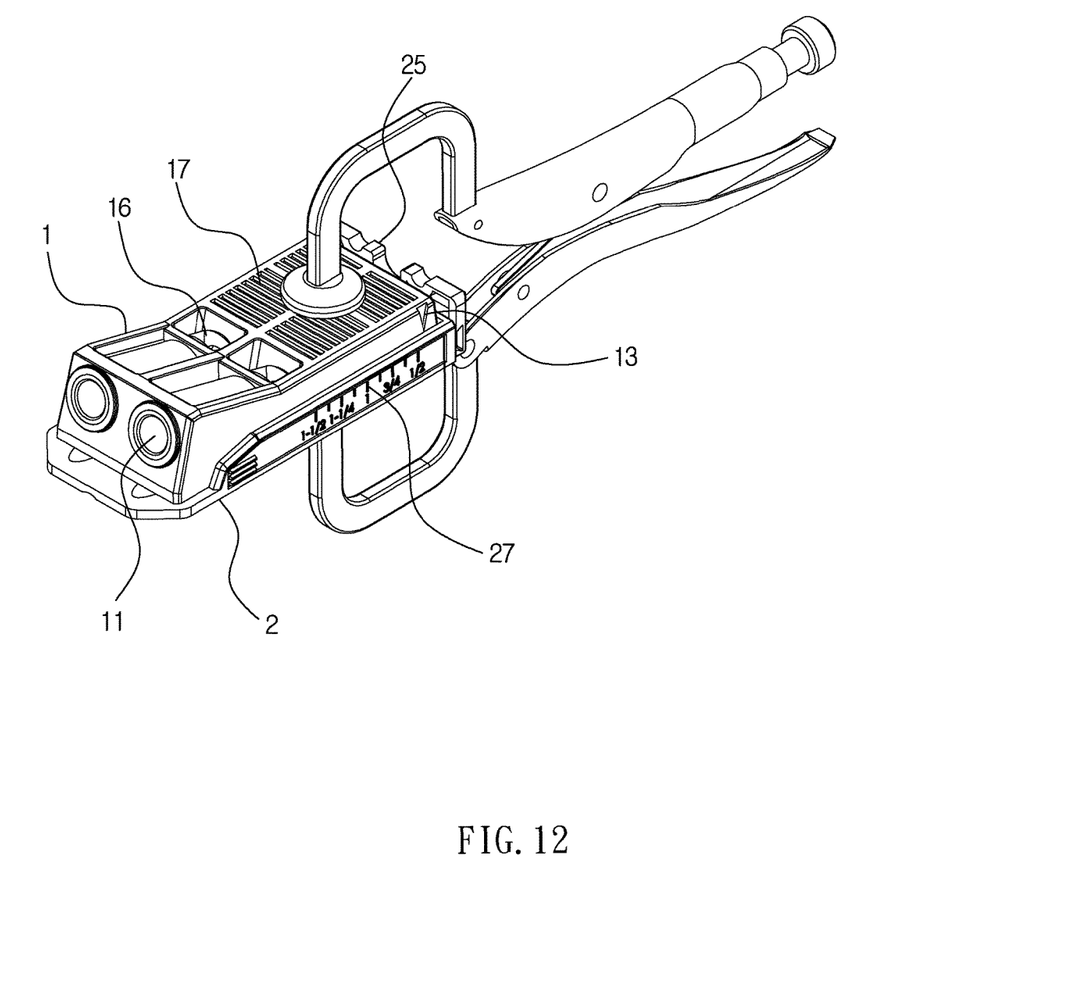
FIG. 12 is a perspective view showing the operation of a second magnetic attraction element of the pocket hole jig according to the preferred embodiment of the present invention.

The body 1 further includes a second magnetic attraction element 18 secured on the pressing face 17 thereof. As illustrated in FIG. 12, the second magnetic attraction element 18 magnetically attracts with a pocket hole jig made of metal material.

The holder 2 further includes a thickness scale section 28 arranged on the bottom thereof so as to measure thicknesses of the wooden workpieces.

Thereby, the pocket hole jig of the present invention measures the thickness of the wooden workpiece easily and determines the size of the screw.

Preferably, the pocket hole jig is capable of distinguishing drilling portion of the wooden workpiece quickly.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A pocket hole jig comprising:
a body, a holder, and a fitting sleeve, wherein:
the body includes at least one accommodation orifice defined on one end thereof and configured to house a driller, each accommodation orifice tilting downwardly and extending toward a bottom of the body, the body also including a first marking portion arranged on a first side surface thereof;
the holder includes an operation room in which the body is fitted and moves relative to the holder, at least one through groove formed on a bottom of the holder so as to correspond to the at least one accommodation orifice, and a first scale section arranged on a first side surface thereof and aligning with the first marking portion, such that a user can distinguish a position of the body relative to the holder and can also determine a size of a screw; and
the fitting sleeve is configured to fit onto the driller, the holder further including a depth scale section for measuring depths of holes to be drilled on wooden workpieces by the driller;
the holder further includes a stop plate and a dovetail block, the dovetail block arranged on a first end of the holder, the stop plate having a dovetail trench for engaging with the dovetail block and has a contacting extension fixed over a top or the bottom of the holder;
the body further includes a second marking portion arranged on a second side surface thereof, and the holder further includes a second scale section arranged on a second side surface thereof and aligning with the second marking portion, such that the user can distinguish the position of the body relative to the holder and can also determine the size of the screw; and
when the contacting extension is fixed over the top of the holder, a position of the body relative to the holder is adjustable by way of the first marking portion and the first scale section, and when the contacting extension is fixed over the bottom of the holder, the body and the holder are usable to measure drilling positions of the wooden workpieces by way of the second marking portion and the second scale section.

2. The pocket hole jig as claimed in claim 1, wherein the contacting extension has a receiving trough defined thereon so as to house the driller.

3. The pocket hole jig as claimed in claim 1, wherein the holder further includes at least one rib formed in the operation room, and the body further includes a toothed section arranged on the bottom thereof so as to selectively engage with the at least one rib.

4. The pocket hole jig as claimed in claim 1, wherein the body includes a first magnetic attraction element mounted on the bottom thereof, and the holder includes a metal projection for magnetically attracting with the first magnetic attraction element.

5. The pocket hole jig as claimed in claim 1, wherein the body further includes at least one chip elimination opening defined on the top thereof and communicating with the two accommodation orifices.

6. The pocket hole jig as claimed in claim 1, wherein the body further includes a pressing face formed on the top thereof, and the pressing face has anti-slip patterns arranged thereon.

7. The pocket hole jig as claimed in claim 6, wherein the body further includes a second magnetic attraction element secured on the pressing face thereof.

8. The pocket hole jig as claimed in claim 6, wherein the holder further includes a thickness scale section arranged on the bottom thereof so as to measure thicknesses of the wooden workpieces.

\* \* \* \* \*